United States Patent
DiBene, II et al.

(10) Patent No.: US 12,443,260 B2
(45) Date of Patent: *Oct. 14, 2025

(54) SYSTEMS AND METHODS FOR COHERENT POWER MANAGEMENT

(71) Applicant: Apple Inc., Cupertino, CA (US)

(72) Inventors: Joseph T. DiBene, II, Santa Cruz, CA (US); Inder M. Sodhi, Palo Alto, CA (US); Keith Cox, Sunnyvale, CA (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,819

(22) Filed: Nov. 29, 2023

(65) Prior Publication Data
US 2024/0160268 A1     May 16, 2024

Related U.S. Application Data

(63) Continuation of application No. 17/528,380, filed on Nov. 17, 2021, now Pat. No. 11,868,192, which is a (Continued)

(51) Int. Cl.
*G06F 1/3206* (2019.01)
*G06F 1/3203* (2019.01)
*G06F 1/3296* (2019.01)

(52) U.S. Cl.
CPC .......... *G06F 1/3206* (2013.01); *G06F 1/3203* (2013.01); *G06F 1/3296* (2013.01)

(58) Field of Classification Search
CPC ..... G06F 1/3206; G06F 1/3203; G06F 1/3296
See application file for complete search history.

(56) References Cited

U.S. PATENT DOCUMENTS

| 5,754,869 A | 5/1998 | Holzhammer |
| 7,337,339 B1 | 2/2008 | Choquette et al. |

(Continued)

FOREIGN PATENT DOCUMENTS

| CN | 102692991 A | 9/2012 |
| EP | 1607838 A2 | 12/2005 |

(Continued)

OTHER PUBLICATIONS

ISR and WO, PCT/US2018/017834, mailed May 4, 2018, 12 pages.
(Continued)

*Primary Examiner* — Aurel Prifti
(74) *Attorney, Agent, or Firm* — Kowert, Hood, Munyon, Rankin & Goetzel, P.C.; Dean M. Munyon

(57) ABSTRACT

In an embodiment, a system includes multiple power management mechanism operating in different time domains (e.g., with different bandwidths) and control circuitry that is configured to coordinate operation of the mechanisms. If one mechanism is adding energy to the system, for example, the control circuitry may inform another mechanism that the energy is coming so that the other mechanism may not take as drastic an action as it would if no energy were coming. If a light workload is detected by circuitry near the load, and there is plenty of energy in the system, the control circuitry may cause the power management unit (PMU) to generate less energy or even temporarily turn off. A variety of mechanisms for the coordinated, coherent use of power are described.

20 Claims, 7 Drawing Sheets

Related U.S. Application Data continuation of application No. 16/519,347, filed on Jul. 23, 2019, now Pat. No. 11,204,636, which is a continuation of application No. 15/430,699, filed on Feb. 13, 2017, now Pat. No. 10,423,209.

(56) References Cited

U.S. PATENT DOCUMENTS

| | | | |
|---|---|---|---|
| 7,370,220 | B1 | 5/2008 | Nguyen |
| 7,640,446 | B1 | 12/2009 | Donovan |
| 8,479,029 | B2 | 7/2013 | Safford et al. |
| 8,484,498 | B2 | 7/2013 | Branover |
| 9,075,614 | B2 | 7/2015 | Fetzer et al. |
| 9,400,308 | B2 | 7/2016 | Ibrahimovic |
| 9,552,034 | B2 | 1/2017 | Yeagr |
| 9,843,282 | B2 | 12/2017 | Kim |
| 10,048,738 | B2* | 8/2018 | Ardanaz ............ G06F 1/3206 |
| 10,423,209 | B2 | 9/2019 | DiBene, II et al. |
| 11,204,636 | B2 | 12/2021 | DiBene et al. |
| 2006/0026447 | A1 | 2/2006 | Alon et al. |
| 2007/0049133 | A1* | 3/2007 | Conroy ............ G06F 1/30 439/894 |
| 2007/0050646 | A1 | 3/2007 | Conroy |
| 2008/0288798 | A1 | 11/2008 | Cooper |
| 2009/0049314 | A1* | 2/2009 | Taha ............ G06F 1/3296 713/300 |
| 2009/0150695 | A1 | 6/2009 | Song |
| 2009/0158061 | A1 | 6/2009 | Schmitz |
| 2009/0164812 | A1 | 6/2009 | Capps, Jr. |
| 2009/0167092 | A1 | 7/2009 | Ma |
| 2009/0168843 | A1 | 7/2009 | Waters et al. |
| 2010/0115304 | A1 | 5/2010 | Finkelstein |
| 2010/0292853 | A1 | 11/2010 | McDonnell |
| 2010/0318827 | A1 | 12/2010 | Shah |
| 2010/0332043 | A1 | 12/2010 | Weyland |
| 2011/0173363 | A1 | 7/2011 | Conti et al. |
| 2011/0213997 | A1 | 9/2011 | Kansal |
| 2012/0066526 | A1 | 3/2012 | Salbery |
| 2012/0185703 | A1 | 7/2012 | Machnicki |
| 2012/0254643 | A1 | 10/2012 | Fetzer |
| 2012/0278503 | A1 | 11/2012 | DeCusatis |
| 2013/0017854 | A1 | 1/2013 | Khawer |
| 2013/0076381 | A1 | 3/2013 | Takayanagi et al. |
| 2013/0111191 | A1 | 5/2013 | Murray |
| 2013/0151877 | A1 | 6/2013 | Kadri |
| 2013/0198540 | A1 | 8/2013 | Lee |
| 2014/0088781 | A1 | 3/2014 | Kearns |
| 2014/0143558 | A1* | 5/2014 | Kuesel ............ G06F 1/26 713/300 |
| 2014/0149752 | A1 | 5/2014 | Brock et al. |
| 2014/0149760 | A1 | 5/2014 | Drake |
| 2014/0153420 | A1 | 6/2014 | Garin |
| 2014/0317425 | A1 | 10/2014 | Lien |
| 2014/0365793 | A1 | 12/2014 | Cox |
| 2015/0026495 | A1 | 1/2015 | Jain |
| 2015/0058650 | A1 | 2/2015 | Varma |
| 2015/0067377 | A1 | 3/2015 | Park |
| 2015/0074435 | A1 | 3/2015 | Jane |
| 2015/0134988 | A1 | 5/2015 | Wang |
| 2015/0177823 | A1* | 6/2015 | Maiyuran ............ G06F 1/3243 713/320 |
| 2015/0177824 | A1 | 6/2015 | Ganpule |
| 2015/0185803 | A1 | 7/2015 | Salsbery |
| 2015/0241942 | A1 | 8/2015 | Venumuddala |
| 2015/0378425 | A1 | 12/2015 | Kelly |
| 2016/0018871 | A1 | 1/2016 | Patel et al. |
| 2016/0026663 | A1 | 1/2016 | Krishnamurthy |
| 2016/0070327 | A1* | 3/2016 | Nemani ............ G06F 1/3206 713/300 |
| 2016/0139644 | A1 | 5/2016 | Dawley |
| 2016/0147275 | A1 | 5/2016 | Weissmann |
| 2016/0179173 | A1 | 6/2016 | Eastep |
| 2016/0349828 | A1 | 12/2016 | Weissmann |
| 2016/0378149 | A1 | 12/2016 | Kam |
| 2017/0160789 | A1 | 6/2017 | Hance |
| 2017/0168541 | A1 | 6/2017 | Gendler |
| 2017/0220445 | A1 | 8/2017 | Cunningham et al. |
| 2017/0255251 | A1 | 9/2017 | Zhang |
| 2017/0269652 | A1 | 9/2017 | Lee et al. |
| 2017/0293340 | A1* | 10/2017 | Park ............ G06F 1/329 |
| 2017/0336854 | A1* | 11/2017 | Roychowdhury .... G06F 1/3296 |
| 2018/0039317 | A1 | 2/2018 | Rigier |
| 2018/0060085 | A1 | 3/2018 | Ananthakrishnan et al. |
| 2018/0067532 | A1 | 3/2018 | Chuang et al. |
| 2018/0088647 | A1 | 3/2018 | Suryanarayanan |
| 2018/0143862 | A1 | 5/2018 | Saeidi et al. |
| 2018/0157315 | A1 | 6/2018 | Ehsan et al. |
| 2018/0164873 | A1 | 6/2018 | Gendler et al. |
| 2018/0173298 | A1* | 6/2018 | Gendler ............ G06F 1/3296 |
| 2018/0210522 | A1 | 7/2018 | Jain et al. |
| 2018/0232034 | A1 | 8/2018 | Dibene, II et al. |
| 2019/0034690 | A1 | 1/2019 | DiBene, II et al. |
| 2019/0094949 | A1 | 3/2019 | Kurian |

FOREIGN PATENT DOCUMENTS

| | | |
|---|---|---|
| EP | 2477090 A2 | 7/2012 |
| WO | 2016069019 A1 | 5/2016 |
| WO | 2018148665 A1 | 8/2018 |

OTHER PUBLICATIONS

IPRP, PCT/US2018/017834, mailed Aug. 22, 2019, 8 pages.
Indian Patent Office, First Examination Report, Intellectual Property India Application No. Sep. 24, 2021, 6 pages. Sep. 24, 2021.
Office Action in CN. Appl. No. 2018800090555 mailed Sep. 27, 2022, 16 pages.
Office Action in DE Appl. No. 11201800372.8 mailed Nov. 2, 2022, 8 pages.
Dynamic voltage scaling, wiki.

* cited by examiner

SYSTEMS AND METHODS FOR COHERENT POWER MANAGEMENT

The present application is a continuation of U.S. application Ser. No. 17/528,380, entitled "Systems and Methods for Coherent Power Management," filed Nov. 17, 2021, which is a continuation of U.S. application Ser. No. 16/519,347, entitled "Systems and Methods for Coherent Power Management," filed Jul. 23, 2019 (now U.S. Pat. No. 11,204,636), which is a continuation of U.S. application Ser. No. 15/430,699, entitled "Systems and Methods for Coherent Power Management," filed on Feb. 13, 2017 (now U.S. Pat. No. 10,423,209); the disclosures of each of the above-referenced applications are incorporated by reference herein in their entireties.

BACKGROUND

Technical Field

Embodiments described herein are related to power management in electronic systems and, more particularly, to coherently managing multiple power management circuits included in the system.

Description of the Related Art

Electronic systems implement a variety of power management mechanisms in an attempt to optimize the balance of power consumed and performance achieved. The mechanisms include high speed, high bandwidth mechanisms that are logically close to the load being power managed. For example, the high speed, high bandwidth mechanisms can be integrated on the same integrated circuit as the load or logically close to the load, such as on an interface to the load. The mechanism also includes lower speed, lower bandwidth mechanisms that are logically farther from the load (e.g., nearer the power supply). Generally, the power management mechanisms are not operated in a feedback loop and are independent of each other. Thus, there is no guarantee that the mechanisms will work well together. In fact, the mechanisms may work at cross-purposes at times.

For example, the currents and the rate-of-change of currents (di/dt) are reaching sufficiently large values, and throttle mechanisms are going to be needed to limit the electrical effects at different time-scales. Coordination between these mechanisms can be important to prevent stability issues and excitation of additional noise in the system.

Another consequence of the larger currents and di/dt's is that electrically the performance of various processors such as the central processing units (CPUs) and graphics processing units (GPUs) is being affected due to voltage guardband and droop. If the electrical behavior of the power delivery is not controlled, then the guardband will continue to increase without abatement.

Additionally, the amortization of power within the system can be rather complex. For example, if one is charging and discharging the bus capacitors continually by turning off and on the loads and the sources, significant power can be saved in the system by keeping certain systems on and waiting for the optimal point to turn them off and on. Larger and larger deviations in the electrical behavior will be expected on both the CPU and GPU power rails moving forward.

SUMMARY

In an embodiment, a system includes multiple power management mechanism operating in different time domains (e.g., with different bandwidths) and control circuitry that is configured to coordinate operation of the mechanisms. If one mechanism is adding energy to the system, for example, the control circuitry may inform another mechanism that the energy is coming so that the other mechanism for the coordinated, coherent use of power are described.

BRIEF DESCRIPTION OF THE DRAWINGS

The following detailed description makes reference to the accompanying drawings, which are now briefly described.

Figure 1:
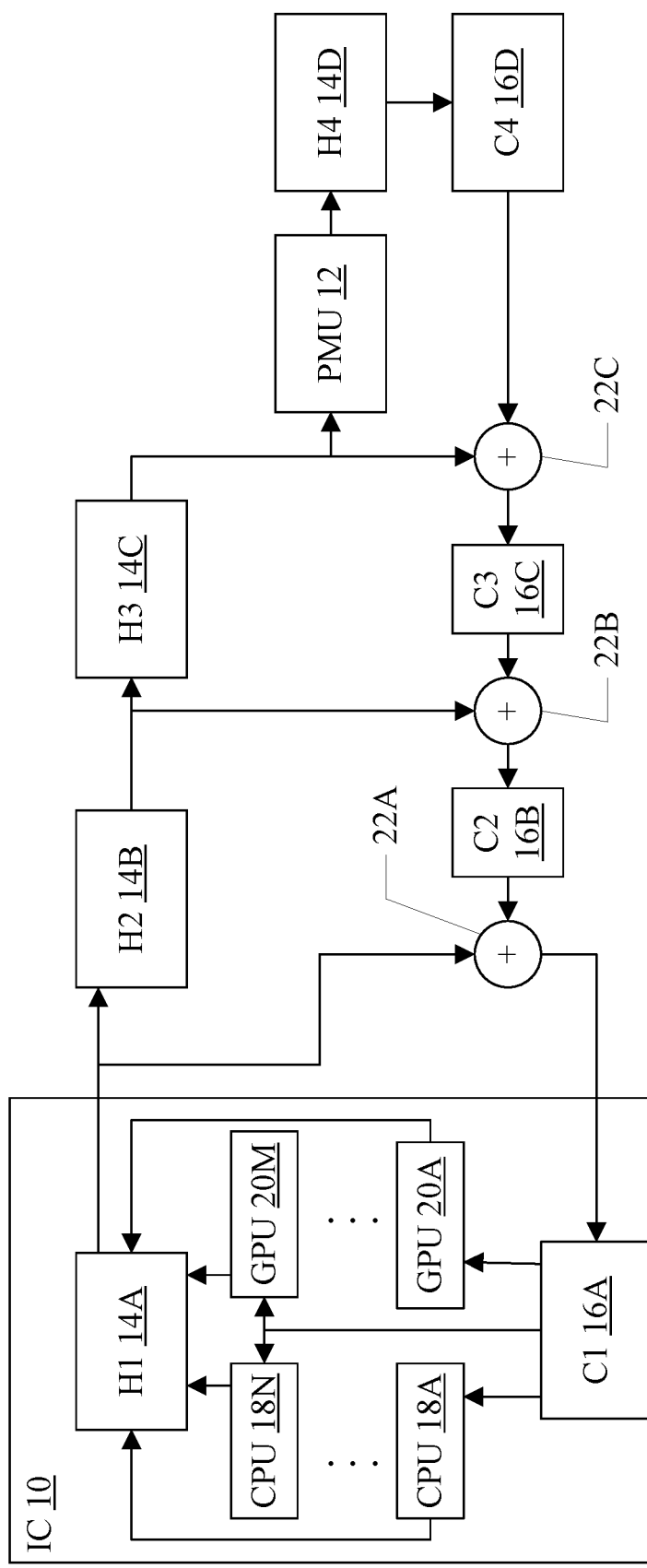
FIG. 1 is a block diagram of a high level view of one embodiment of a system including a coherent power management system (CPMS).

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

The coherent power management system (CPMS) described herein may provide power management coordination across multiple power management mechanisms that may operate on different time scales (e.g., they may have different bandwidths or latencies). That is, a given power management mechanism may have a certain latency to respond to events in the system. The various power management mechanisms may have been designed independently and operate independently, in the absence of CPMS. Accordingly, CPMS is included to coordinate the efforts of the power management mechanisms.

For example, if a first power management mechanism is already in operation to handle an event, other power management mechanisms may be held off or their action may be reduced to account for the operation of the first power management mechanism. If one power management mechanism is about to power down a component but another power management mechanism indicates upcoming activity, the power down may be delayed/cancelled to avoid powering down and shortly thereafter powering up again (wasting energy). While these examples are not exhaustive, they illustrate how energy may be wasted in uncoordinated power management mechanisms. CPMS may attempt to balance the power management and performance of the system, attempting to maximize the performance achieved per unit of energy expended.

In some cases, a slower-acting (lower bandwidth, higher latency) power management mechanism may detect an event earlier in time than a faster-acting (higher bandwidth, lower latency) mechanism by monitoring different parameters and/or by detecting trends (e.g., trajectories) in the change of the parameter rather than detecting a threshold crossing. Combinations of power management mechanisms may be used to detect such trends/trajectories as well. Faster-acting mechanisms may detect trends/trajectories. While the various monitors and compensations circuits may operate at different time scales, they may be monitoring/compensating power delivery to the same load. For example, the load may be one or more processors, such as one or more central processing units (CPUs) and/or one or more graphics processing units (GPUs).

CPMS may generally be implemented for any power-managed load. An example of an integrated circuit having processors is discussed in more detail below, but any electrical load may be used (e.g., integrated circuits without processors, various other electrical components, processors alone on an integrated circuit, etc.).

Turning now to FIG. 1, a block diagram of one embodiment of a system including an integrated circuit (IC) 10, a power management unit (PMU) 12, and circuitry implementing coherent power management in the system is shown. The embodiment of FIG. 1 illustrates the coherent power management circuits at a high level, including transfer function circuits 14A-14D and compensation circuits 16A-16D. The IC 10 includes transfer function circuit 14A and compensation circuit 16A, and further includes one or more processors. For example, the processors may include one or more CPUs 18A-18N and/or one or more GPUs 20A-20M. Other embodiments may include other general purpose processors or special purpose processors as well. The CPUs 18A-18N and GPUs 20A-20M are coupled to the transfer function circuit 14A and the compensation circuit 16A. The transfer function circuits 14A-14C are coupled to each other, and each transfer function circuit 14A-14C is coupled to a respective circuit 22A-22C which combines the output of the transfer function circuit 14A-14C with the output of a compensation circuit 16B-16D to provide input to a compensation circuit 16A-16C as shown in FIG. 1. The output of the transfer function circuit 14C is coupled to the PMU 12, which is coupled to the transfer function circuit 14D. The transfer function circuit 14D is coupled to the compensation circuit 16D.

The transfer function circuits 14A-14D may be configured to monitor various electrical parameters and/or other environmental parameters in the system and may be configured to generate controls for corresponding compensation circuits 16A-16D. The electrical parameters may include voltage and current, for example. Other environmental parameters may include, for example, temperature, activity levels in the load (e.g., CPU usage, CPU usage of certain instructions, GPU usage, etc.), etc. Each transfer function circuit 14A-14D may be operable at a given time window or bandwidth. Different time windows/bandwidths may differ from each other by at least an order of magnitude, in various embodiments. The time windows/bandwidths may be in part a function of the nature of the circuitry (e.g., high frequency filtering, loop stability criteria, etc.) and the parameters being sensed. In an embodiment, the transfer function circuit 14A may have the highest bandwidth/shortest time window/shortest latency and the transfer function circuits 14B-14D may have increasingly lower bandwidths/longer time windows/longer latencies.

The compensation circuits 16A-16D may implement corrective action in response to the inputs from the transfer function circuits 14A-14D and further in response to communications from other compensation circuits 16A-16D acting in response to other transfer function circuits 14A-14D. In some cases, a lesser amount of compensation may be provided by a given compensation circuit 16A-16D if other compensation circuits 16A-16D are already in operation (even if they are slower-acting circuits).

The corrective actions (compensations) implemented by the compensation circuits 16A-16D may vary. For example, the compensation circuits 16A-16D may include throttle circuits of various types. Generally, a throttler attempts to limit activities in the load in some fashion. Throttling can be a logical action (e.g., reducing instruction throughput in a processor my limiting issuance of otherwise ready-to-execute instructions, clock gating, etc.) or a physical action (e.g., reducing the clock frequency of the clocks in the load, removing clock pulses from a clock to effectively reduce the frequency, etc.). The corrective actions may also include attempts to counter the event (e.g., increasing the energy in the system by providing more current from the PMU 12, increasing the voltage to offset a voltage droop, etc.).

The PMU 12 may include one or more voltage regulators configured to supply power to the IC 10 and/or other components of the system. The voltage regulators may have any design and features. For example, multiple phases of buck regulators may be implemented, where the amount of current that may be provided with good regulation of the voltage (minimal droop) is proportional to the number of phases that are on. The number of phases that are turned on at a given point in time may be dependent on the power states of the processors in the IC 10 and/or various events detected by the transfer function circuits 14A-14D.

The IC 10 may be any integrated circuit in various embodiments. For example, the IC 10 may be a processor chip including one or more CPUs 18A-18N and/or one or more GPUs 20A-20M. The IC 10 may be a system on a chip (SOC) including one or more processors and one or more peripheral circuits (e.g., a memory controller coupled to a memory in a given system, bridges to input/output interfaces of various types, audio peripherals, video peripherals, etc.). In some embodiments, the IC 10 may be a fixed function IC without processors.

The CPUs 18A-18N may be any general purpose processors implementing any instruction set. Any microarchitectural features may be implemented (e.g., in-order, out of order, scalar, superscalar, pipelined, speculative execution, etc.). Similarly, the GPUs 20A-20M may be any type of graphics processor and may implement any graphics instruction set. Any microarchitectural features may be employed.

CPMS may in particular be focused on coordinating power management systems for providing power to the processors in the integrated circuit 10 (e.g., the CPUs 18A-18N and/or the GPUs 20A-20M). The processors may have larger dynamic load changes (e.g., current consumptions) than other circuitry in the integrated circuit 10 (e.g., peripherals in an SOC embodiment). In other embodiments, CPMS may also coordinate power management systems for the IC 10 as a whole, or any portions of the IC 10, as desired.

It is noted that the number of transfer function circuits 14A-14D and/or the number of compensation circuits 16A-16D may vary in various embodiments. The numbers of such circuits may be more or fewer than those shown in FIG. 1. More or fewer such circuits may be integrated into the IC 10 or included external to the IC 10.

Figure 2:
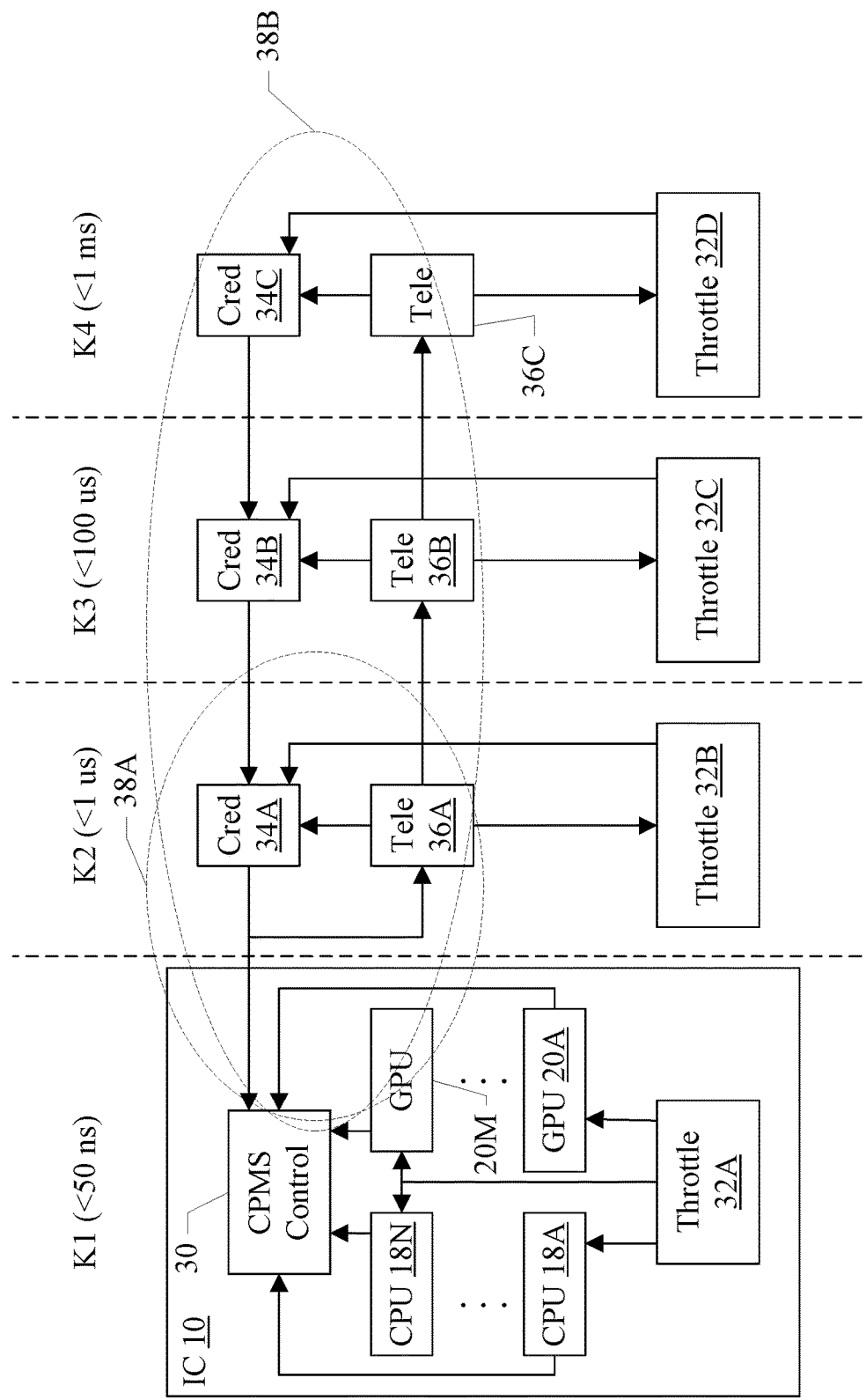
FIG. 2 is a block diagram of one embodiment of the system including the CPMS illustrated as a set of credit state machines, telemetry circuits, and throttle circuits.

Turning next to FIG. 2, a block diagram of one embodiment of a system including CPMS is shown in greater detail. The IC 10 is shown, including the CPUs 18A-18N and the GPUs 20A-20M. The IC 10 also includes a CPMS control circuit 30 and a throttle circuit 32A. The system further includes throttle circuits 32B-32D, telemetry circuits 36A-36C, and credit circuits 34A-34C. The CPMS control circuit 30 is coupled to the telemetry circuits 36A-36C and the credit circuits 34A-34C.

The vertical dashed lines in FIG. 2 divide the components into K states (or K windows) K1 to K4. The bandwidth/latency of the components of CPMS in each K state are represented by the times associated with the K states (less than 50 nanoseconds for K1, less than 1 microsecond for K2, less than 100 microseconds for K3, and less than 1 millisecond for K4). The times for each K state are exemplary, and other embodiments may have other times associated with K states and more or fewer K states. The difference between a given K state and the next slower (or next faster) K state may be one or more orders of magnitude in various embodiments. The credit circuits 34A-34C, telemetry circuits 36A-36C, and throttle circuits 32B-32D within a given K state are coupled together.

Each K state (or time domain) has an associated time characteristic, which may be an indicator of how quickly circuitry in the K state may react to inputs to produce compensation outputs. The time characteristic may be expressed as a bandwidth, a latency, a clock period, or any other measure of time.

The throttle circuits 32A-32D may implement various throttling mechanisms, such as those described above with regard to FIG. 1. Thus, the throttle circuits 32A-32D may be examples of compensation circuits 16A-16D in FIG. 1. As discussed in more detail below, the telemetry circuits 36A-36C and corresponding credit circuits 34A-34C may be examples of transfer function circuits 14A-14D.

The telemetry circuits 36A-36C may measure various parameters in the system (voltage, current, temperature, etc.)

to detect events for which corrective action may be indicated. The telemetry circuits 36A-36C may communicate with credit circuits 34A-34C, which may exchange credits with each other indicating detected events and corrective actions being taken by other K states. Thus, the credits may help prevent over compensating for events that are detected by multiple telemetry circuits 36A-36C. For example, if the telemetry circuit 36C detects an event and initiates corrective action via throttle circuit 32D, the credit circuit 34C may issue credits to reflect the corrective action. If another telemetry circuit (e.g., telemetry circuit 36A) detects the same event or a parameter change that is related to the same event, the credits communicated by the credit circuit 34C to the credit circuit 34A may prevent a corrective action from the throttle circuit 32B or may reduce the throttling performed by the throttle circuit 32B, since the throttle circuit 32D is performing corrective action (even if the effect of the corrective action isn't visible in the K2 state yet because of the latency of the K4 state).

The CPMS control circuit 30 may coordinate between the credit circuits 34A-34C and telemetry circuits 36A-36C. For example, the CPMS control circuit 30 may convert credits issued by one of the credit circuits 34A-34C to credits for the other credit circuits 34A-34C. For example, the credits may be distributed to different credit circuits based on which corresponding telemetry circuits 36A-36C are likely to detect the same event or a parameter change related to the same event. The credits may be distributed based on which corrective actions are more likely to complement the corrective action taken by the initially-activated throttle circuit 32A-32D, etc.

Viewed in another way, the combination of a given telemetry circuit 36A-36C, a corresponding credit circuit 34A-34C, and the CPMS control circuit 30 may be form a control loop (dotted ovals 38A and 38B for the K2 state and the K4 state, respectively). The CPMS control circuit 30 may be responsible for providing feedback in each control loop based on activities in the other control loops.

Figure 3:
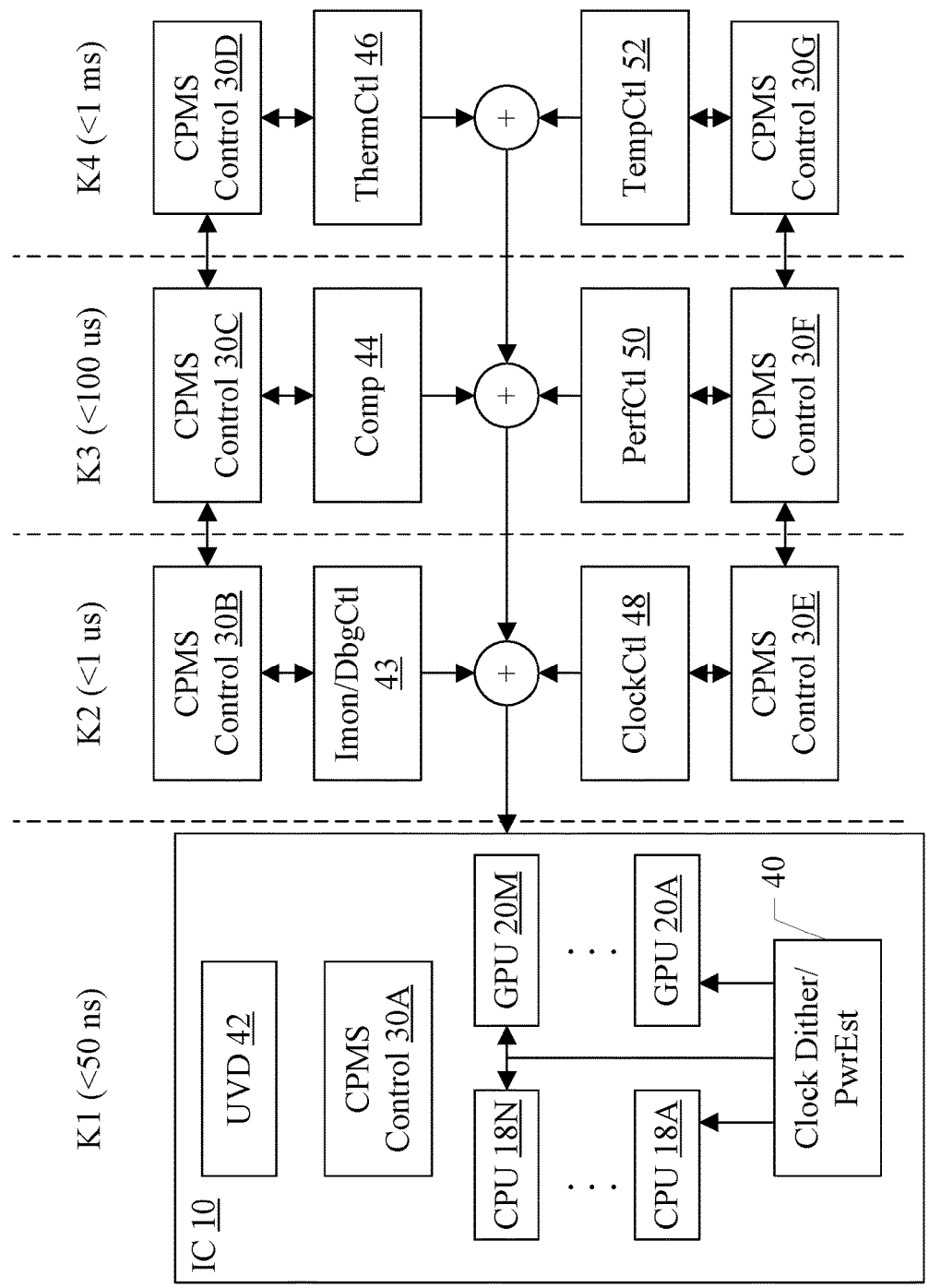
FIG. 3 is a block diagram of one embodiment of the system including the CPMS with specific compensation circuits and detector circuits.

FIG. 3 is a block diagram of an embodiment of the system including CPMS, shown in greater detail. In the embodiment of FIG. 3, the IC 10 includes the CPUs 18A-18N and the GPUs 20A-20M. Additionally, the IC 10 includes clock dither/power estimator (PwrEst) circuit 40, an undervoltage detector circuit (UVD) 42, and CPMS control circuit 30A. The CPMS control circuit 30 of FIG. 2 may be distributed in this embodiment with the CPMS control circuit 30A in the IC 10, and CPMS control circuits 30B and 30E in the K2 state; CPMS control circuits 30C and 30F in the K3 state; and CPMS control circuits 30D and 30G in the K4 state. The telemetry circuits 36A-36C include a current monitor (Imon)/debug control (DbgCtl) circuit 43, voltage comparator circuit 44, and thermal control (ThermCtl) circuit 46. The throttle circuits 32A-32D may include the clock dither/PwrEst circuit 40, clock control (ClockCtl) circuit 48, performance control (PerfCtl) circuit 50, and temperature control (TempCtl) circuit 52. It is noted that some of the circuits 42, 43, 44, 46, 48, 50, 52, and 30B-30G may be included in the IC 10 even though the operate in different K states than the K1 state.

The UVD circuit 43 may be configured to detect undervoltage events near the CPUs 18A-18N/GPUs 20A-20M on the IC 10. An undervoltage event may be a voltage droop below a certain threshold or at a certain rate, indicating that the current load of the CPUs 18A-18N/GPUs 20A-20M may be exceeding the capability of the power distribution network on the IC 10 and/or the PMU 12.

The Imon/DbgCtl circuit 42 may detect currents above a certain threshold (or above a certain level over a period of time, and/or may detect various logic states in the system that may indicate events to be compensated. The voltage comparator 44 may compare the external supply voltage from the PMU 12 to one or more thresholds programmed into the system. The ThermCtl circuit 46 may detect temperatures that exceed a certain threshold or thresholds.

The clock dither/PwrEst circuit 40 may dither the clock to reduce effective clock frequency temporarily in response to events, and may digitally estimate the power consumed in the processors of the IC to cause throttling of high power portions of the processors. The ClockCtl circuit 48 may be configured to slowly reduce the clock frequency as the supply voltage magnitude droops. The PerfCtl circuit 50 may be configured to ensure that power consumption of the system as a whole does not exceed a certain level. The TempCtl circuit 52 may respond to thermal events by rapidly shutting down processors in the IC 10.

Figure 4:
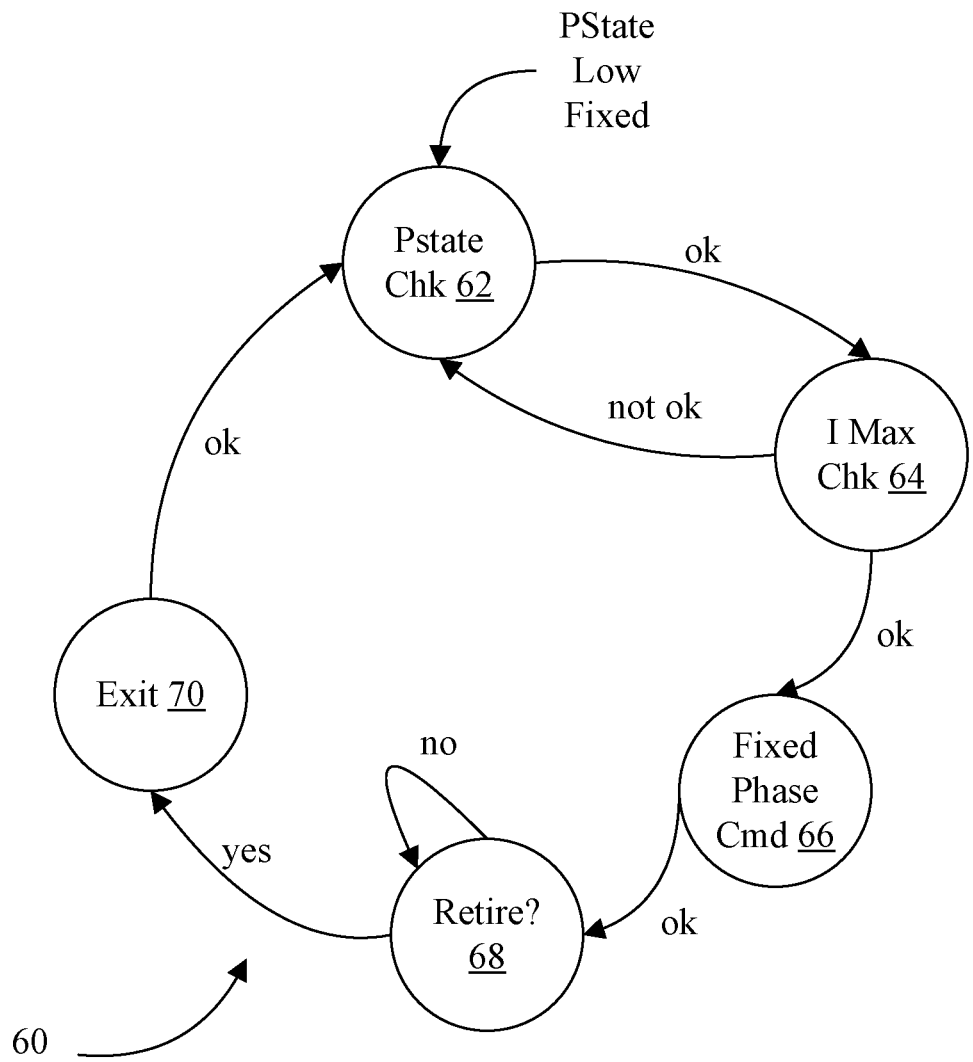
FIG. 4 is a block diagram of one embodiment of a state machine for a fixed phase compensation circuit.
Figure 5:
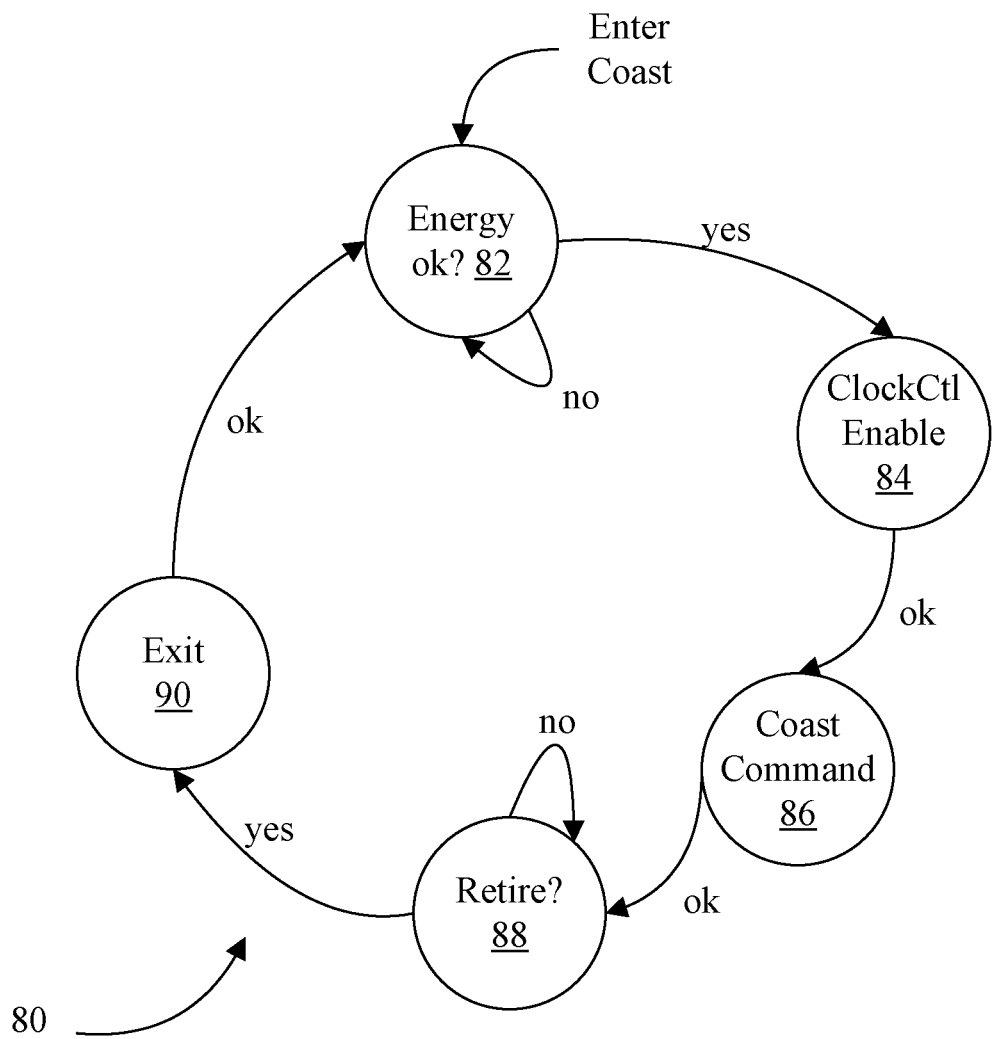
FIG. 5 is a block diagram of one embodiment of a state machine for a coasting compensation circuit.
Figure 6:
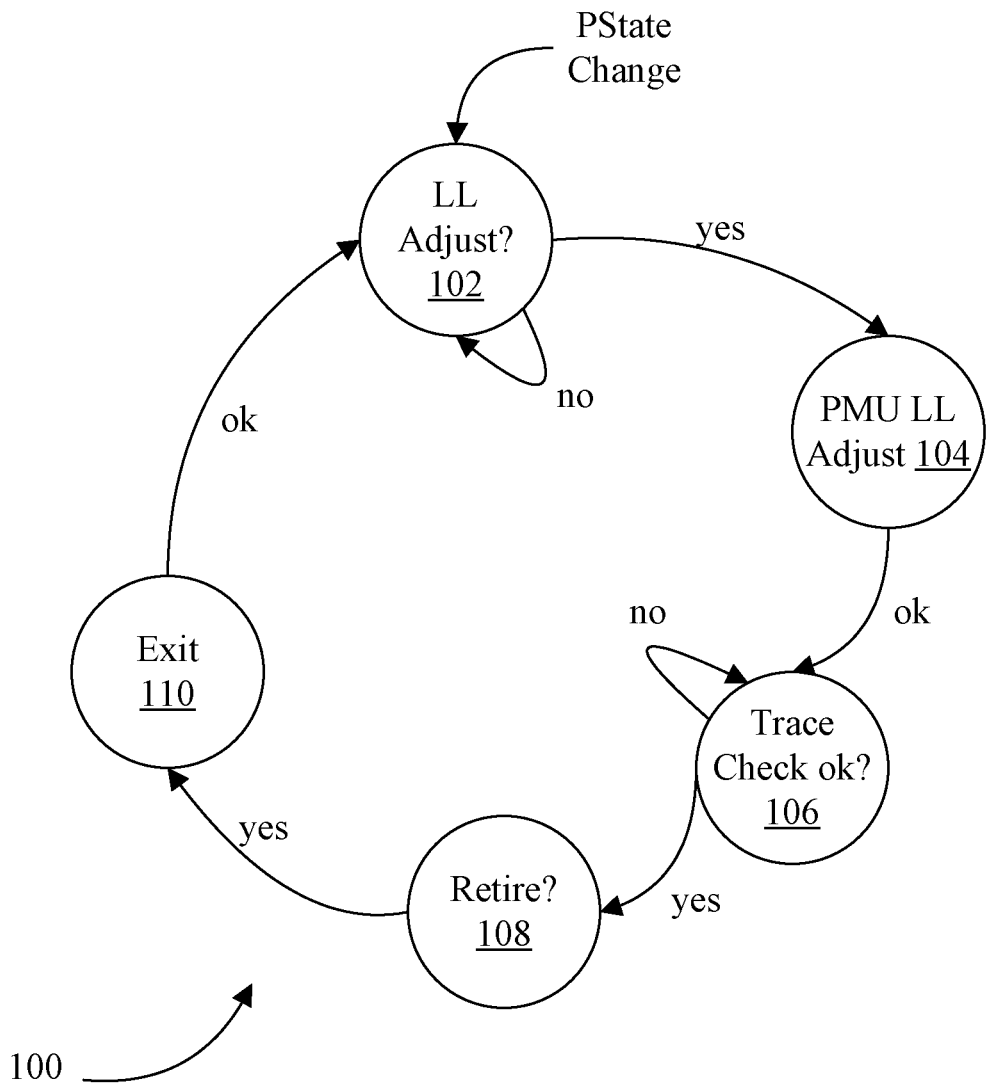
FIG. 6 is a block diagram of one embodiment of a state machine for a dynamic load line compensation circuit.

FIGS. 4 to 6 illustrate certain examples of power management mechanisms that may be employed in various embodiments of CPMS. The examples are not intended to be limiting, as there may be numerous other mechanisms implemented in addition to or in place of these examples.

FIG. 4 is a state machine 60 illustrating one embodiment of fixed phase compensation mechanism. When, for example, the CPUs 18A-18N and/or the GPUs 20A-20M are operating in low power modes (low power supply voltage magnitude and low clock frequency), the maximum current that the PMU 12 may be required to deliver may be limited by the fact that the low power mode is associated with a lower maximum current. In an embodiment, a fixed number of phases of voltage converters in the PMU 12 may be sufficient to supply the current, as well as current needs of other devices in a system with the IC 10. The number of phases may be one, or may be more than one, but may be less than the maximum number of phases in the PMU 12. Because other devices in the system may power on and may temporarily present a load that would cause the PMU 12 to enable additional phases, the fixed phase compensation mechanism may prevent such enabling and thus conserve power. The additional phases may not be needed because the CPU/GPU power state may ensure that enough current is available for the other device within the current that may be provided by the already-enabled phase(s). The state machine 60 may be part of the CPMS control circuit 30A, in an embodiment, or may be implemented in a distributed fashion over one or more CPMS control circuits 30A-30G, or may be implemented wholly outside the IC 10, in various embodiments.

The CPMS control circuit 30A may receive an indication from a power manager in the IC 10 (not shown) that at least tracks power states in the IC 10 and may, in some embodiments, control the power states. The indication may describe a change in the power state of one or more CPUs/GPUs. The state machine may be in a power state check (PState Chk) state 62. In response to the indication, the state machine may transaction to a current maximum check (I Max Chk) state 64, in which the CPMS control circuit 30A may determine if the maximum current that may be drawn by the CPUs/GPUs in the new power state is low enough to be supplied by the PMU 12 in fixed phase mode. For example, the CPMS control circuit 30A may have a lookup table programmed with power states and corresponding maximum current limits. If the currents are not serviceable in fixed phase mode, the state machine may return to the PState chk state 62. On the other hand, if the currents are serviceable in fixed phase mode, the CPMS control circuit 30A may transmit a fixed phase command to the PMU 12 to cause the PMU 12 to operate in fixed phase mode (Fixed Phase Cmd state 66). In an embodiment, the fixed phase command may cause the PMU 12 to operate in pulse frequency modulation (PFM) mode rather than burst continuous current mode (CCM). If the mode is being "retired" (e.g., a new power state is about to be entered) (Retire State 68), the CPMS control circuit 30A may transmit an exit command (Exit state 70) to the PMU 12 and then return to the PState Chk state 62.

FIG. 5 is a state machine 80 illustrating one embodiment of a coasting compensation mechanism. The state machine 80 may be part of the CPMS control circuit 30A, in an embodiment, or may be implemented in a distributed fashion over one or more CPMS control circuits 30A-30G, or may be implemented wholly outside the IC 10, in various embodiments.

Coast mode may be a low power mode that may shut down (or "turn off") the PMU 12 output rail for a predetermined time and may allow load (e.g., the IC 10, or more particularly the CPUs and/or GPUs) to operate on the stored energy in the capacitance in and near the load. For example, an IC 10 is often surrounded by "decoupling capacitance" that is connected between power rail and ground rail. The capacitance is charged when the power rail is actively driven to a voltage level by the PMU 12, and supplies current when noise events or other activities results in instantaneous variations in the load current. In low power modes for the CPUs/GPUs, the active power drain may be known with a reasonable degree of certainty. In some low power modes (e.g., sleep modes), there may be no activity in load. In such circumstances, the PMU 12 may disable the power rail and allow the system to use the stored charge. The rate of discharge may be known for a given capacitance and low power mode, and thus the maximum length of the time period that coast mode may be active is known and thus the maximum time that the coast mode may last before re-enabling the PMU 12 to provide more charge to the power rail. Generally, a power rail may be disabled if the PMU is not actively providing charge (e.g., current) to keep the rail at a certain voltage while the load consumes the current. The rail is enabled if the PMU is actively providing charge.

The CPMS control circuit 30A may receive an enter coast indication when a CPU/GPU enters a state in which coast mode may be used (e.g., a power state low enough that the energy consumption is low and known with a certain degree of circuitry, or a sleep state in which activity in the CPU/GPU stops). Based on the state of the CPUs/GPUs and the energy available in the system (state 82), the CPMS control circuit 30A may determine whether or not there is enough energy available to enter coast mode. If not, the state machine 80 may remain in state 82 and the coast mode may not be entered.

Calculating available energy and determining if coast mode is to be entered may be performed in various ways. For example, the CPMS control circuit 30A may measure the average load current and voltage, and compute the average energy consumption per unit time. Alternatively, the average energy consumption for various states of the CPU/GPU may be provided in a table or other storage to be read by the CPMS control circuit 30A. After determining the energy consumption rates, determining the current available energy (based on capacitance and voltage), and determining the workload duration and margins from the consumption rate and available energy, the CPMS control circuit 30A may send a command to the clock control circuit 48 (FIG. 3) to track the voltage drift and adjust the clock based on the voltage drift (state 84). The clock control circuit 48 may acknowledge, and the CPMS control circuit 30A may send a command to the PMU 12 to enter coast mode for a particular rail (state 86). The PMU may tri-state the rail (disabling the rail) and the output bridges, temporarily shutting down. The voltage may be monitored by the CPMS control circuit 30A at the load as the frequency slowly scales (by the clock control circuit 48) with the voltage to maintain timing margins. At some point (e.g., after the maximum duration has expired, or in response to an attempt to increase the power state of a CPU/GPU), the state machine may retire the coast mode (state 88). The CPMS control circuit 30A may signal the PMU 12 to start back up in PFM mode to maintain the retention voltage for the load (state 90). The CPMS control circuit 30A may disable coast mode and the PMU 12 may await a command to adjust the voltage for the next on-coming power state to run the next workload.

FIG. 6 is a state machine 100 for one embodiment of a dynamic load line compensation circuit. The state machine 80 may be part of the CPMS control circuit 30A, in an embodiment, or may be implemented in a distributed fashion over one or more CPMS control circuits 30A-30G, or may be implemented wholly outside the IC 10, in various embodiments.

A dynamic load line mechanism may be a dynamic shift in the load line of a PMU 12 between power states and/or within a power state to optimize power savings for the system. It is based on the fact that the maximum current has been computed within a given power state and that the voltage regulator may shift from one load line to the next to maintain lower power in the system.

Usually, a load line and voltage guard band is fixed for a given power state. In many cases, the system has one load line and the voltage guard band is fixed for a given power state (but may change between power states). However, with a dynamic load line, CPMS may compute two things in the system. First, the CPMS control circuit 30A may compute the correct load line for a given power state and cause the shallowest load line (lowest slope) to be used within that power state if it is not already computed and adjusted. Second, if a workload trace has been logged for a given workload, the CPMS control circuit 30A may check the trace log and compute the shallowest load line for this workload. That is, if the workload trace has a maximum droop spec based on previous information, the CPMS control circuit 30A may compute the shallowest load line that will meet the spec and send a command to adjust the load line to lower the power is consumed in the system.

Workload tracing may be a mechanism in which CPMS identifies a given workload (e.g., a task, an app, a thread from a task etc.) and traces the power management-related events that occur during performance of that workload. The trace may be used in a subsequent execution of the same workload to predict events that may need to be managed in the subsequent execution.

In the state machine 100, an indication that a power state is changing may cause the CPMS control circuit 30A to determine if the load line may be adjusted (state 102). If so, the CPMS control circuit 30A may transmit a load line adjust command to the PMU 12 (state 104). If there is a trace, and the trace check indicates that the load line is ok (state 106), the CPMS control circuit 30A may wait for either a change in power state or other retirement cause to exit the adjusted load line (state 108) and may transmit an exit command to the PMU 12 (indicating that it may return to a default load line or that a new load line command may be coming) (state 110).

Figure 7:
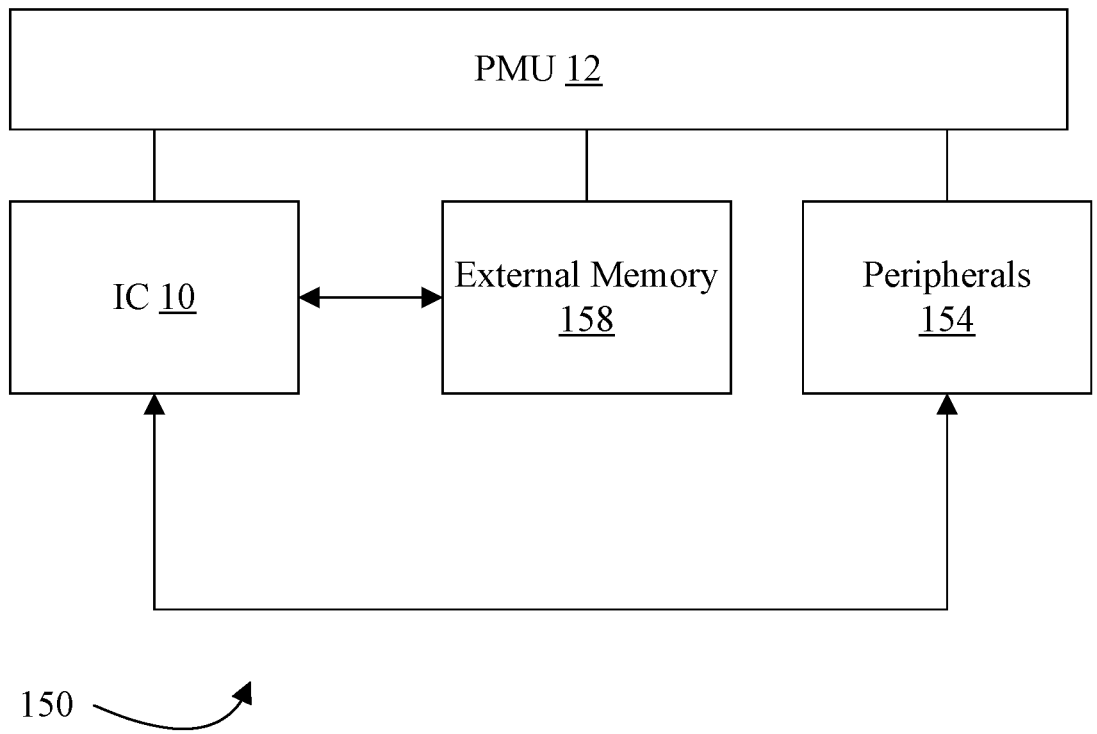
FIG. 7 is a block diagram of one embodiment of a system.

FIG. 7 is a block diagram of one embodiment of a system 150. In the illustrated embodiment, the system 150 includes at least one instance of an integrated circuit (IC) 10 coupled to one or more peripherals 154 and an external memory 158. The PMU 12 is provided which supplies the supply voltages to the IC 10 as well as one or more supply voltages to the memory 158 and/or the peripherals 154.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.). In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g., desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The DRAMs 12A-12B may be any type of such DRAM as listed above. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 10 in a chip-on-chip or package-on-package implementation.

Figure 8:
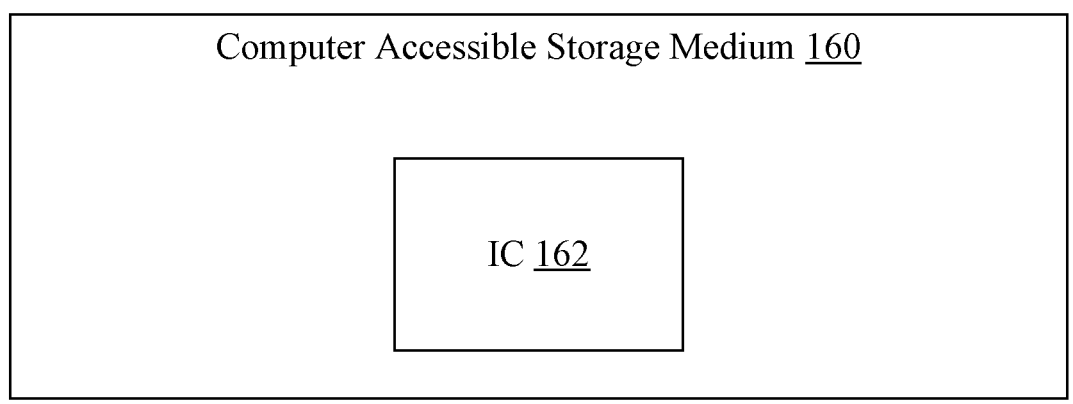
FIG. 8 is a block diagram of one embodiment of a computer accessible storage medium.

FIG. 8 is a block diagram of one embodiment of a computer accessible storage medium 160 storing an electronic description of the IC 10 (reference numeral 162) is shown. The description may further include other components such as the portions of the CPMS that may be outside the IC 10 in some embodiments. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 stored on the computer accessible storage medium 160 may be a database which can be read by a program and used, directly or indirectly, to fabricate the hardware comprising the IC 10 and/or other components of the system. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 10. The netlist may then be placed and routed to produce a data set describing geometric shapes to be applied to masks. The masks may then be used in various semiconductor fabrication steps to produce a semiconductor circuit or circuits corresponding to the IC 10. Alternatively, the description 162 on the computer accessible storage medium 300 may be the netlist (with or without the synthesis library) or the data set, as desired.

While the computer accessible storage medium 160 stores a description 162 of the IC 10, other embodiments may store a description 162 of any portion of the IC 10 and/or any portion of the system.

Numerous variations and modifications will become apparent to those skilled in the art once the above disclosure is fully appreciated. It is intended that the following claims be interpreted to embrace all such variations and modifications.

What is claimed is:

1. An apparatus comprising:
a processing circuit;
a power management circuit including at least one voltage regulator configured to supply power to the processing circuit;
a plurality of monitoring circuits configured to monitor power conditions of the processing circuit, the power conditions including at least one electrical parameter of the power supplied to the processing circuit, wherein a given one of the plurality of monitor circuits is configured to operate in a different one of a plurality of time domains concurrent with other ones of the plurality of monitoring circuits operating in respective different ones of the plurality of time domains, wherein a time characteristic corresponding to a given one of the plurality of time domains is different in magnitude from a magnitude of a time characteristic corresponding to another one of the plurality of time domains; and
a plurality of compensation circuits, wherein ones of the plurality of compensation circuits are configured to implement one or more corrective actions in response to variations in the power conditions as detected by ones of the plurality of monitoring circuits, wherein a given one of the plurality of compensation circuits is configured to operate in a different one of the plurality of time domains concurrent with other ones of the plurality of compensation circuits operating in respective different ones of the plurality of time domains.

2. The apparatus of claim 1, further comprising a plurality of transfer circuits, wherein ones of the plurality of transfer circuits are configured to transfer data between ones of the plurality of time domains, and wherein a given one of the plurality of compensation circuits is configured to carry out a corrective action in response to data input from multiple ones of the plurality of time domains.

3. The apparatus of claim 1, wherein the time characteristic corresponding to the given one of the plurality of time domains is different by one or more orders of magnitude with respect to the time characteristic corresponding to another one of the plurality of time domains.

4. The apparatus of claim 3, wherein a first time characteristic for a first time domain of the plurality of time domains is different from a second time characteristic for a second time domain of the plurality of time domains by one or more orders of magnitude.

5. The apparatus of claim 1, wherein the time characteristic of a first one of the plurality of time domains is a first bandwidth and wherein the time characteristic of a second one of the plurality of time domains is a second bandwidth different from the first bandwidth.

6. The apparatus of claim 1, wherein the time characteristic of a first one of the plurality of time domains is a first latency and wherein the time characteristic of a second one of the plurality of time domains is a second latency different from the first latency.

7. The apparatus of claim 1, wherein the processing circuit and at least one of the plurality of monitoring circuits are integrated onto a common integrated circuit.

8. The apparatus of claim 7, wherein the power management circuit is implemented externally with respect to the common integrated circuit.

9. A method comprising:
monitoring, using a plurality of monitoring circuits, one or more parameters of electrical power provided to an integrated circuit, a given one of the plurality of monitoring circuits operating in a different one of a plurality of time domains concurrent with other ones of the plurality of monitoring circuits operating in respective different ones of the plurality of time domains and according to a respective time characteristic that is different with respect to the other ones of the plurality of monitoring circuits, wherein respective time characteristics of the ones of the plurality of monitoring circuits differ in magnitude from respective time characteristics of the other ones of the plurality of monitoring circuits;
compensating, using a plurality of compensation mechanisms implemented by ones of a plurality of compensation circuits, for variations in the electrical power provided to the integrated circuit, wherein a given one of the plurality of compensation circuits is configured to operate in a different one of the plurality of time domains concurrent with other ones of the plurality of compensation circuits operating in respective different ones of the plurality of time domains, and wherein the given one of the plurality of compensation circuits is further configured to operate concurrent with and according to different time characteristics with respect to other ones of the plurality of compensation circuits; and
coordinating operation of the plurality of compensation mechanisms when the plurality of compensation mechanisms are reacting to a same variation in the electrical power to the integrated circuit.

10. The method of claim 9, wherein the different time characteristics differ from one another by one or more orders of magnitude.

11. The method of claim 9, further comprising compensating, using the plurality of compensation mechanisms, for variations in power provided to one or more processing circuits implemented on the integrated circuit.

12. A system comprising:
an integrated circuit, wherein the integrated circuit includes at least one processing circuit and a coherent power management circuit; and
a plurality of telemetry circuits external to the integrated circuit, wherein a given one of the plurality of telemetry circuits is configured to operate in a different one of a plurality of time domains concurrent with other ones of the plurality of telemetry circuits operating in respective different ones of the plurality of time domains and in accordance with a respective one of a plurality of time characteristics, wherein ones of the plurality of time characteristics have a magnitude different from other ones of the plurality of time characteristics; and
a plurality of limiting circuits, wherein ones of the plurality of limiting circuits are coupled to respective ones of the plurality of telemetry circuits, wherein ones of the plurality of limiting circuits are configured to limit activity in the at least one processing circuit, wherein ones of the plurality of limiting circuits are configured to communicate with the coherent power management circuit via ones of the plurality of telemetry circuits.

13. The system of claim 12, wherein at least a first limiting circuit of the plurality of limiting circuits is configured to cause a limitation of issuance of instructions for execution by the at least one processing circuit, and wherein at least a second limiting circuit of the plurality of limiting circuits is configured to cause dithering of a clock signal provided to the at least one processing circuit.

14. The system of claim 12, wherein at least one of the plurality of limiting circuits is configured to cause a reduction of a frequency of a clock signal provided to the at least one processing circuit.

15. The system of claim 12, wherein at least one of the plurality of limiting circuits is configured to cause gating of a clock signal provided to the at least one processing circuit.

16. The system of claim 12, wherein the plurality of time characteristics include first, second and third time characteristics, wherein the second time characteristic is at least one order of magnitude greater than the first time characteristic, and wherein the third time characteristic is at least one order of magnitude greater than the second time characteristic.

17. The system of claim 12, wherein at least a first telemetry circuit of the plurality of telemetry circuits is configured to measure a system voltage, and wherein at least a second telemetry circuit of the plurality of telemetry circuits is configured to measure a system temperature.

18. The system of claim 12, further comprising a plurality of credit circuits, wherein ones of the credit circuits are configured to operate in accordance with a corresponding one of the plurality of time characteristics and are coupled to a corresponding one of the plurality of telemetry circuits, wherein, in response to a corrective action carried out by one of the limiting circuits, ones of the plurality of telemetry circuits are configured to cause credits to be exchanged between ones of the plurality of credit circuits.

19. The method of claim 9, wherein a first compensation circuit of the plurality of compensation circuits operates according to a first time characteristic distinct from a second time characteristic with which a second compensation circuit of the plurality of compensation circuits operates, wherein the first time characteristic indicates a first latency of the first compensation circuit, and wherein the second time characteristic indicates a second latency of the second compensation circuit.

20. The system of claim 12, wherein the time characteristic of the plurality of time characteristics includes a bandwidth of the corresponding telemetry circuit of the plurality of telemetry circuits.

* * * * *